United States Patent [19]

Schad et al.

[11] Patent Number: 5,645,865
[45] Date of Patent: *Jul. 8, 1997

[54] INSERT MOLDING SYSTEM

[75] Inventors: Robert D. Schad, Toronto, Canada; William C. Young, Ypsilanti, Mich.

[73] Assignee: Husky Injection Molding Systems Ltd., Canada

[*] Notice: The term of this patent shall not extend beyond the expiration date of Pat. No. 5,582,845.

[21] Appl. No.: 577,826

[22] Filed: Dec. 22, 1995

[51] Int. Cl.$^6$ .............................. B29C 45/14; B29C 45/76
[52] U.S. Cl. ........................ 425/126.1; 425/129.1; 425/135; 425/137; 425/169
[58] Field of Search ................ 425/126.1, 129.1, 425/135, 136, 137, 169, 436 R, 444, 556

[56] References Cited

U.S. PATENT DOCUMENTS

| | | | |
|---|---|---|---|
| Re. 33,237 | 6/1990 | Delfer, III | 425/547 |
| 3,172,149 | 3/1965 | Kornmayer | 425/135 |
| 3,677,680 | 7/1972 | Etherington | 425/129.1 |
| 3,827,856 | 8/1974 | Van De Walker et al. | 425/126.1 |
| 3,900,278 | 8/1975 | Beck et al. | 425/126.1 |
| 3,964,847 | 6/1976 | Redmer et al. | 425/126.1 |
| 4,067,944 | 1/1978 | Valyi | 264/89 |
| 4,832,176 | 5/1989 | Okuma et al. | 198/418.1 |
| 4,942,008 | 7/1990 | Cahill | 264/150 |
| 5,286,426 | 2/1994 | Rano, Jr. et al. | 264/40.1 |
| 5,527,173 | 6/1996 | Miller et al. | 425/126.1 |
| 5,527,174 | 6/1996 | Godin et al. | 425/126.1 |

OTHER PUBLICATIONS

Article Entitled "AAA is Shaping the Plastic Industry and Trimming Costs With It's Equipment," dated Jul. 1988 in the publication Plastics World.

*Primary Examiner*—James P. Mackey
*Attorney, Agent, or Firm*—Bachman & LaPointe, P.C.

[57] ABSTRACT

A system for manufacturing multi-layered preforms from inserts is provided. The system comprises a device for molding the inserts into the multi-layered preforms and a mechanism for arranging the inserts used in forming the preforms into proper position for subsequent relocation to the molding device. A first loading station is provided for receiving the inserts from the mechanism for arranging, wherein the inserts are properly positioned for the molding device when located with the first loading station. A second loading station is also provided along with a mechanism for moving the inserts from the first loading station to the second loading station. A device for relocating the inserts from the second molding station to the molding device is used. A device for detecting if the inserts are at least one of present and absent during movement through the system is also provided. If at least one insert is present where the at least one insert should be absent and if at least one insert is absent where the insert should be present, an indicator thereof may be actuated.

25 Claims, 6 Drawing Sheets

INSERT MOLDING SYSTEM

BACKGROUND OF THE INVENTION

This invention is directed to article handling and molding systems, and more particularly, to a system for handling and overmolding preform inserts for forming multi-layered preforms.

For molding systems, various processing steps are typically necessary to place an article to be further molded into proper position for such molding. This is particularly true in overmolding processes where one article having already been molded or finished in earlier processes is enlarged or altered through an additional molding process. In many systems, the article to be further processed, for example, through overmolding, is not subject to all handling and processing procedures by one comprehensive machine. Processing steps which may comprise such systems include aligning and orienting the articles, moving the articles to the molding machine, molding or overmolding the articles and removing the articles from the machine for subsequent packaging or further processing. The prior art includes systems or machines directed to these processing steps but fails to disclose a comprehensive machine for systematically performing all of the processed steps.

Article aligning and distributing devices are shown in U.S. Pat. No. 3,827,856 to Van de Walker et al. and U.S. Pat. No. 4,832,176 to Okuma et al. These patents show two different techniques for aligning and handling articles.

Van de Walker et al. discloses an apparatus for loading inserts onto insert receiving seats of a mold. The apparatus is directed for use in mass manufacturing of elongated hollow plastic objects, having inserts at the ends thereof, such as ballpoint pens. The inserts are automatically loaded by vibrating the same into pockets and then lifting them out of the pockets into suction tubes which pass to a horizontal transfer plate and into nests in a vertical transfer plate. A vacuum is employed to maintain the inserts in the nests during movement of the vertical transfer plate to a position adjacent the distal ends of hollow core pins through which air is sucked. The vacuum in the vertical transfer plate is then converted to pressure to cause the inserts to fly across the air gaps of the core pin ends, following which the inserts are maintained on such ends by suction. A mold is enclosed to cause the inserts to engage spring bias plungers, and then plastic is injected.

Okuma et al. discloses a system for automatically distributing and supplying parts. The system includes a base displaceable with respect to a foundation and first and second positioning members fixed to the base at different heights. A movable body is mounted on the base and movable toward and away from a parts installing device by an actuator. A parts feed mechanism is provided which has an angularly movable arm and is mounted on the movable body. A holder is mounted on the arm such that the movable body is displaced by the actuator toward the parts installing device. This allows the holder to supply the parts to the parts installing device after the parts delivered from the parts distributing device to the first positioning member have been delivered through flexible tubular members to the second positioning member. The parts are positioned and held in the holder and the holder is brought into confronting relation to the parts installing device in the parts discharge position.

Accordingly, these patents show only parts handling and aligning systems and not a comprehensive all purpose system for forming multilayered preforms.

Another step in forming preforms is molding or overmolding. U.S. Pat. No. 4,067,944 to Valyi is directed to overmolding systems.

The patent to Valyi discloses a method for obtaining a multi-layered, hollow plastic article having side walls which are oriented in the axial, radial and tangential directions. Plastic material is injection molding about an insert covered core to form a multi-layered parison which is then transferred on the core to first and second blow molds for blow molding to a hollow article. A parison mold and core are maintained in axial alignment in the insert and blow molds are moved therebetween for engagement with the core. In the Valyi case, all transfer takes place for movement of the insert from injection molding to blow molding and accordingly, is not directed to the handling and orientation of the insert prior to molding.

The unloading or transfer of articles to be molded is another step found in molding processes. Particularly, the article is moved from a first position to a second position where at the second position, the article can be oriented for the molding operation.

U.S. Pat. No. Re. 33,237 to Delfer, III discloses an apparatus for producing hollow plastic articles. The apparatus includes an injection molding machine having a first mold portion with at least one cavity therein and a second mold portion having at least one elongated core, which core is adapted to seat in the cavity in the mold closed position. Accordingly, in the mold closed position, a first number of hot hollow plastic articles and an injection molding cycle is formed. A means for reciprocating is provided for reciprocating the mold portions from the mold closed position to a mold open position for forming a gap between the mold portions. A carrier plate means is also provided having at least two sets of cavities therein for cooling the hollow plastic articles. The number of cavities in the carrier plate corresponds to a multiple of at least two times the number of hollow plastic articles produced in an injection molding cycle. A means for moving is also provided for moving the carrier plate means into and out of the gap. In addition, a means for aligning, one set at a time, the carrier plate means cavities to juxtapose the set of cavities with the hollow plastic articles formed in an injection molding cycle, is provided. Finally, a means for transferring the hollow plastic articles to the juxtaposed cavities is also provided.

U.S. Pat. No. 4,942,008 to Cahill discloses a process for molding a multiple layer structure. In this process, a plastic sleeve is placed and then enclosed in a mold cavity. A flowing heated plastic is conducted into the mold cavity, radially inside the sleeve, and forced radially outward against the sleeve. The flowing plastic forces the sleeve outward and forms, with the sleeve, an integrally bonded laminated structure. The mold is opened and the plastic structure is removed, and this structure may then be reformed to form a container particularly suitable for containing beverages, foods, cosmetics, pharmaceuticals and chemicals.

While Delfer III, Cahill and Valyi disclose molding systems and processes, each of the patents fails to disclose a comprehensive system for sorting, handling, transporting, and molding inserts.

Yet another step that is used in the molding system processes, is that of sensing the positions of the articles to be molded or overmolded so as to verify their positions and presence. The following systems are directed to position sensing.

U.S. Pat. No. 3,677,680 to Etherington discloses a fluidic sensing device for molding systems. The system disclosed employs fluidic sensing and fluidic control logic to provide alarm signals that prevent loading of molding compound into the mold cavity when the insert in one or more of a group of mold cavities is not properly seated. The system also prevents closing of the mold and insertion of an insert bearing mandrel when all inserts of a previous operation have not been withdrawn from the cavities. A vacuum drawn on the hollow mandrels retains the insert in place upon the end of the mandrel, cools the mandrels, and cooperates with the fluid sensing devices to indicate the presence or absence of the inserts.

An article dated July, 1988 in the publication Plastics World, discloses a system using a closed circuit television camera for visually inspecting mold cavities. The system detects changes from light to dark and alarms the machine if a dark object remains after ejection, signifying a part has remained stuck in the cavity.

U.S. Pat. No. 5,286,426 discloses a method for assembling a lead frame between a pair of molding cavity plates. This method uses light detection means for determining the correct positioning of an inserted part in a molding operation.

While each of these references show sensing systems, neither disclose a comprehensive sensing system for use with a comprehensive insert handling and overmolding system.

There exists, therefore, a need for a comprehensive system for use in conjunction with an injection molding machine for properly unscrambling, handling, moving and overmolding articles, while sensing the absence and presence of the articles throughout movement through the system.

SUMMARY OF THE INVENTION

The primary object of this invention is to provide a comprehensive system for unscrambling, handling, moving and overmolding articles while sensing the position and presence of the articles throughout the system.

Another object of this invention is to provide a comprehensive system for handling preform inserts for subsequent overmolding to form multi-layered preforms, wherein the system continuously operates to unscramble, arrange, transport, sense, and overmold the inserts.

Still another object of this invention is to provide a comprehensive system for overmolding preform inserts, which system and process are operative to unscramble and insert inserts into a mold as well as removed finished preforms from the mold and direct the same to a removal station.

And still another object of this invention is to provide a comprehensive system for overmolding preform inserts to form multi-layered preforms, which system includes a system for continually tracking the presence or absence of the preform inserts in various stages of the system.

These objects and advantages are achieved by the system for manufacturing multi-layered preforms from inserts of the present invention. The system comprises means for molding the inserts into the multi-layered preforms; means for arranging the inserts used in forming the preforms into proper position for subsequent relocation to the means for molding; a first loading station for receiving the inserts from the means for arranging, wherein the inserts are properly positioned for the means for molding when located with the first loading station; a second loading station; means for moving the inserts from the first loading station to the second loading station; means for relocating the inserts from the second molding station to the means for molding; and means for detecting if the inserts are at least one of present and absent during movement through the system. If at least one insert is present where the at least one insert should be absent and if at least one insert is absent where the insert should be present, the systen may include an indicator thereof which is activated.

The details of the present invention are set out in the following description and drawings wherein like reference characters depict like elements.

DETAILED DESCRIPTION OF THE PREFERRED EMBODIMENT

Figure 1:
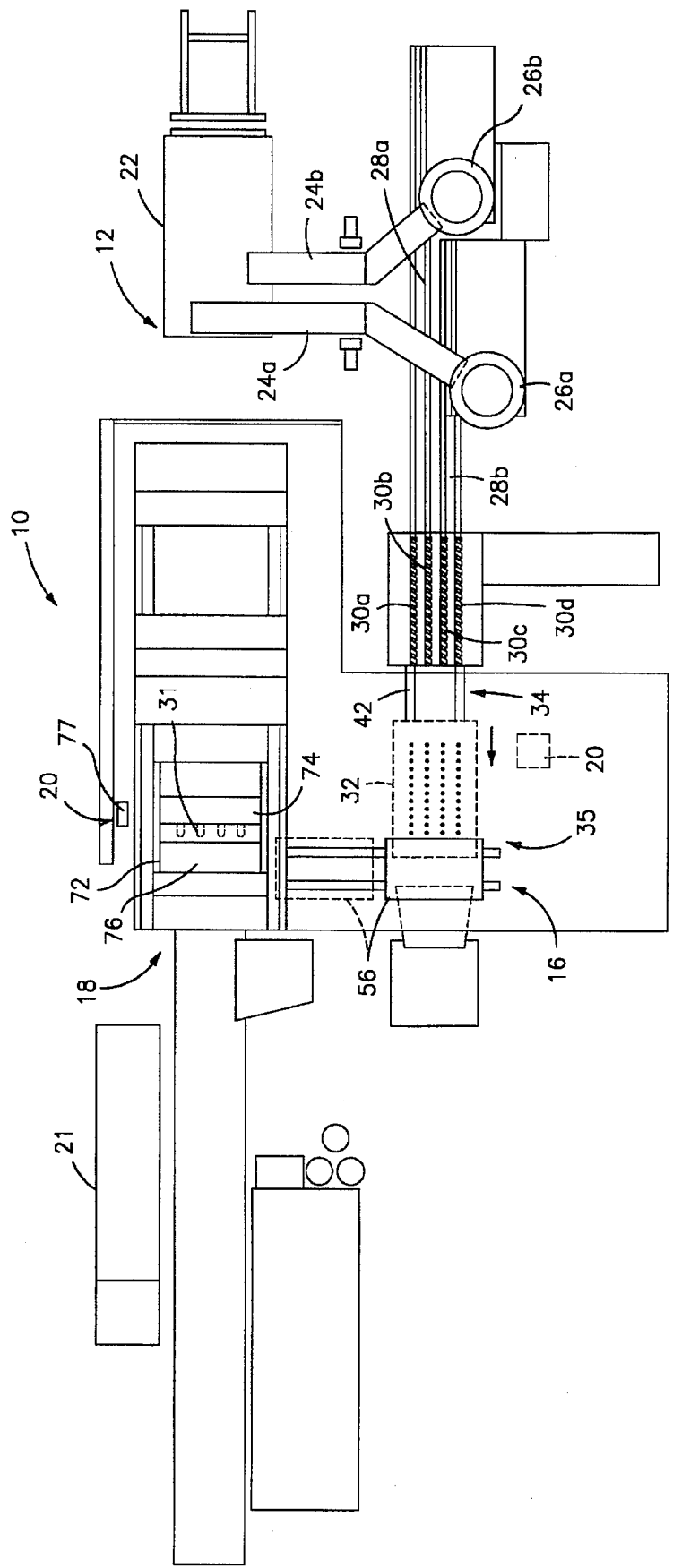
FIG. 1 is an overhead schematic view of an insert handling system in accordance with the principles of the present invention.
Figure 2:
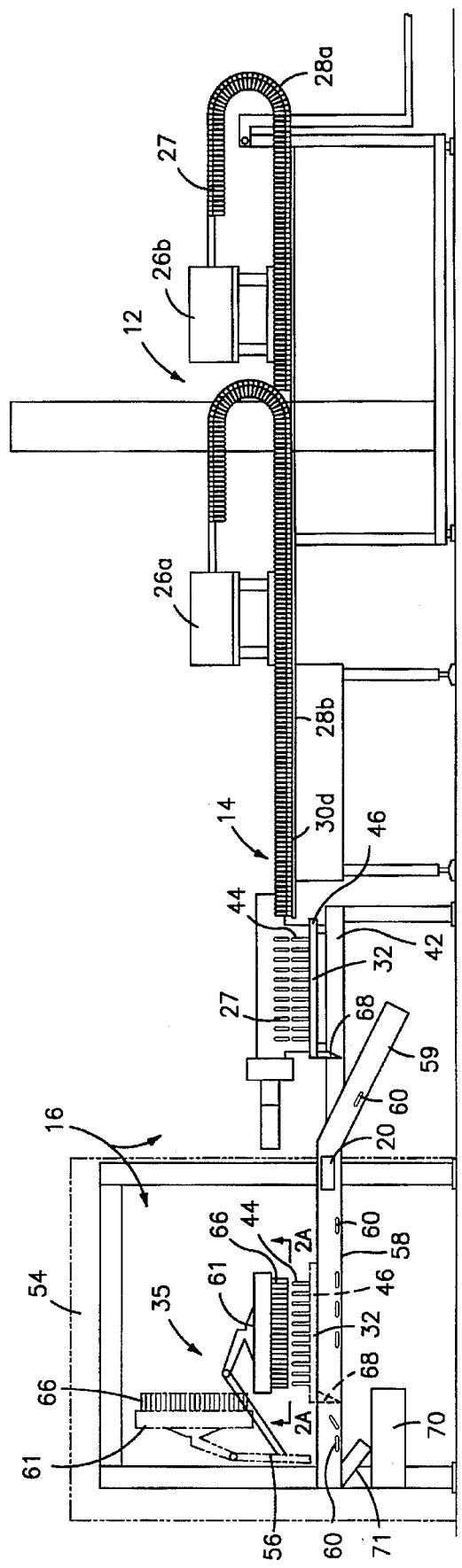
FIG. 2 is a front elevational schematic view of the insert handling system shown in FIG. 1.

Referring now to the drawings in detail, there is shown in FIG. 1 an overhead view of the preform insert molding system of the present invention, designated generally as 10. System 10 generally includes insert unscrambling station 12, insert array forming mechanism 14, insert transferring and loading mechanism 16, and overmolding station 18. System 10 further includes an insert detection system 20 (shown schematically) operative to sense or detect the presence and absence of inserts while the inserts are moved through the system and a controller 21 for automating the system. FIG. 2 provides an elevational view of system 10 including the elements mentioned above.

Figure 3:
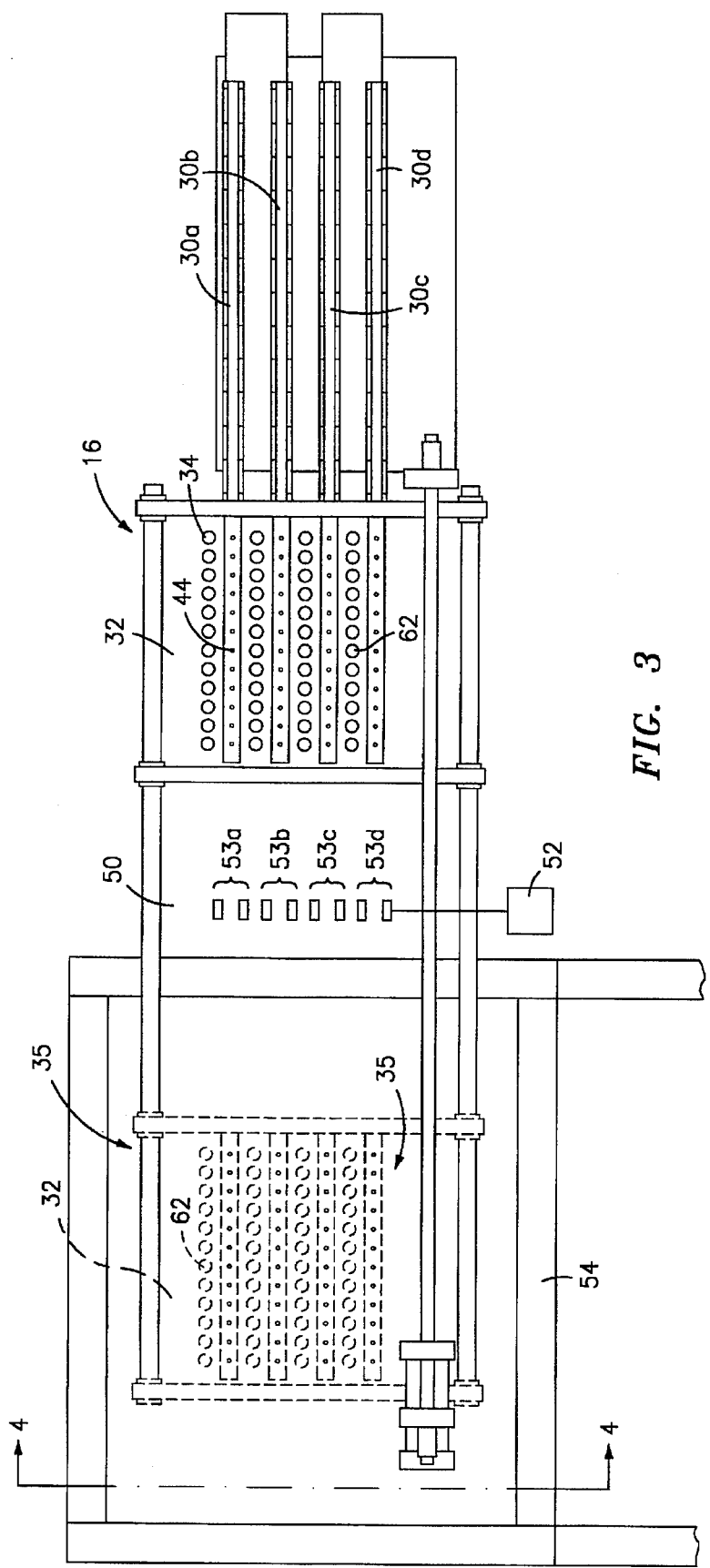
FIG. 3 is an enlarged view of the insert transfer and loading mechanism of FIG. 1.

Unscrambling system 12 includes a bulk feeding unit 22, as shown in FIGS. 1 and 2, and infeed conveyers 24a and 24b for feeding inserts from unit 22 to bowl feeders 26a and 26b, respectfully. The inserts 27, as shown in FIG. 2, are unscrambled in bowl feeders 26a and 26b and arranged such that inserts 27 are output from the bowl feeders in an upright position and substantially side by side. Inserts 27 are moved from bowl feeders 26a and 26b onto infeed conveyers 28a and 28b in the upstanding side by side orientation. Referring also to FIG. 3, linear spacing devices such as feed screws 30a–30d are provided downstream of infeed conveyers 28a and 28b. Feed screws 30a–30d are operative to space apart inserts 27 such that they are positioned to match the positions of mold cores 31 in overmolding station 18, as shown by dotted lines in FIG. 1, for a subsequent injection molding step, discussed below. Accordingly, as discussed in more detail below, the feed screws function to place inserts 27 in a number of rows having a prescribed number of inserts so as to match the layout of mold cores 31. In the preferred embodiment, the four feed screws 30a–30d are operative to place groups of inserts 27 in a layout comprising four rows, wherein each row includes twelve equally spaced inserts. An unscrambling unit such as that shown in U.S. Pat. No.

4,832,176 to Okuma et al., issued May 23, 1989, can be used with this invention an accordingly, is hereby incorporated herein.

Figure 4:
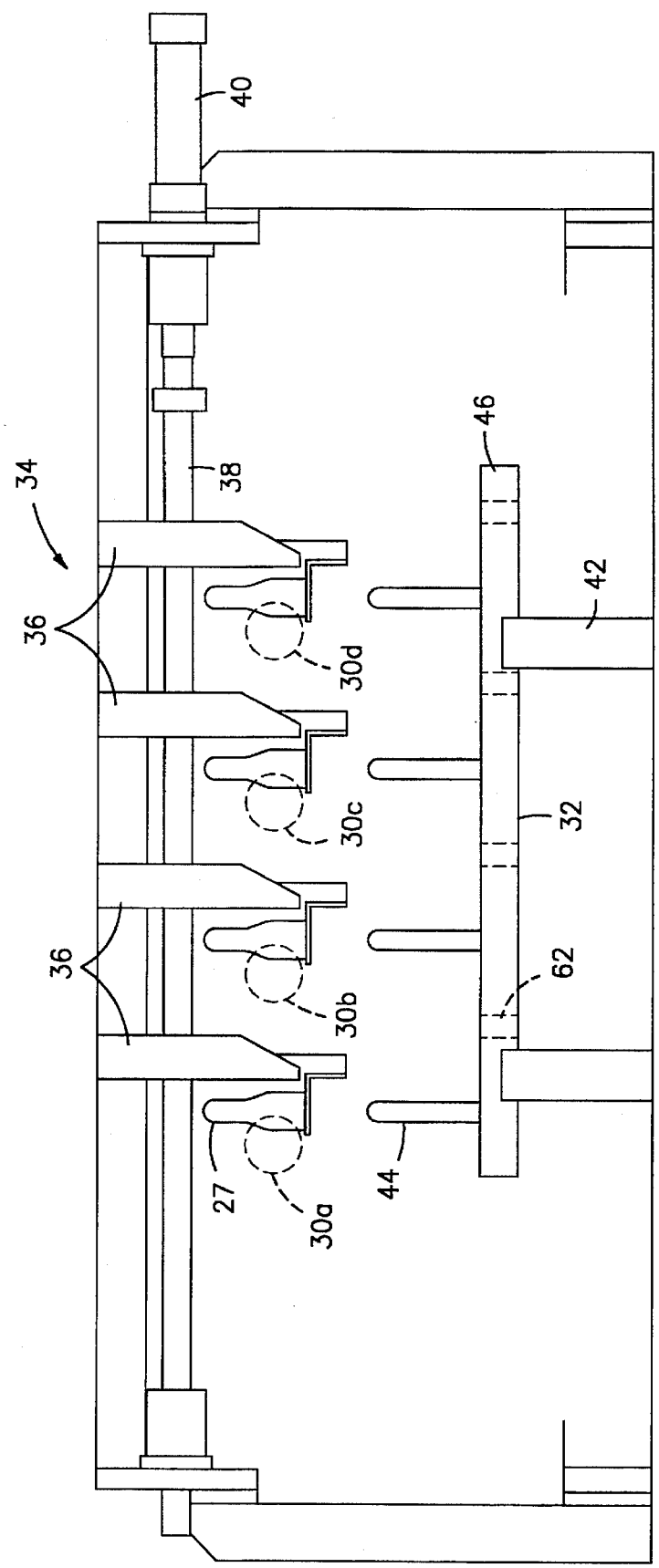
FIG. 4 is an end elevational view taken along line 4—4 of FIG. 3.

From the feed screws 30a–30d, inserts 27 are delivered in the spaced apart multi-row orientation to the insert transfer and loading mechanism 16, as shown in FIGS. 2–4.

Transfer and loading mechanism 16 includes a shuttle table 32 adapted to receive the arrayed preforms from a first loading station 34 and move the inserts to a second loading station 35, as indicated by the dotted lines representing shuttle table 32 in FIGS. 1–3. As shown in FIG. 4, first loading station 34 preferably comprises an enclosure which collects the spaced inserts from feed screws 30a–30d. As inserts 27 are moved into first loading station 34, they are supported by movable flaps 36 positioned under inserts 27, as shown in FIG. 4. Flaps 36 are mounted to a movable arm 38 connected with a cylinder 40. As cylinder 40 is actuated, movable arm 38 is moved, thereby moving flaps 36 out from under inserts 27. Shuttle table 32 is preferably movable between first loading station 34 on tracks 42 so as to move from first loading station 34 to a second loading station.

Shuttle table 32 also includes a plurality of elements in the form of mandrels or pins 44 extending upwardly from a base 46, which base 46 is preferably mounted on tracks 42. Mandrels 44 are positioned on base 46 in the same arrangement in which inserts 27 were orientated via feed screws 30a–30d. That is, mandrels 44 are preferably provided in four rows, wherein each row includes 12 mandrels in the same spacing as inserts 27, as shown in the side and end views of FIGS. 2 and 4. Mandrels 44 are therefore aligned with inserts 27 and have an outside diameter slightly less than the inside diameter of the inserts. Accordingly, when movable flaps 36 are moved from under inserts 27 via cylinder 40 and movable arm 38, inserts 27 are released onto mandrels 44 for subsequent movement to second loading station 35.

En route to second loading station 35, as indicated by the dotted lines, insert detection system 20 is operable for determining the absence and presence of inserts 27 on mandrels 44. Preferably, sensors 50 are positioned adjacent base 46 and mandrels 44 of shuttle table 32 so as to sense the presence and absence of the inserts. Preferably, four sets of light transmitter/detector units 53a–53d (shown schematically) are used which comprise sensors 50 and are mounted on a support (not shown) astride each of the four parallel lines of mandrels, as shown in FIG. 3. The type of system used is not critical, and accordingly, other sensing systems can be used as well, including mechanical systems, which physically, through feelers, test the absence and presence of inserts on mandrels 44 and provide a signal indicating the result. As shuttle table 32 moves towards second loading station 35, each mandrel is preferably checked via one of sensors 50 so that the presence of an insert on the mandrel is determined. If an insert is determined as missing through transmitter/detector units 53a–53d en route to second loading station 35, preferably via a breakage in a light beam, an indicator, preferably an alarm 52, shown schematically, is activated. At this juncture, the operation may be altered to correct the problem. Preferably, controller 21 is used to command the shuttle table to recycle with the first loading station for adding the absent insert. Otherwise, the cycle can be aborted and the mandrels entirely reloaded with inserts.

Second loading station 35 is preferably positioned in an enclosure 54 which houses a robot 56 (shown schematically) for moving inserts 27 from shuttle table 32 to overmolding station 18. Below tracks 42 a table 58 is preferably provided for receiving finished multilayered preforms 60 unloaded from tooling plate 61 of robot 56 on its return from overmolding station 18. Table 58 may also receive rejected preforms or inserts from tooling plate 61. For transferring inserts from mandrels 44 of shuttle table 32, robot 56 is moved into position above the shuttle table. For receiving finished preforms 60 from robot 56, base 46 of shuttle table 32 includes a plurality of openings 62 therein for the pass through of preforms released from robot 56, as shown in FIGS. 3 and 4. Openings 62 are positioned between the rows of mandrels 44 such that there are four rows of openings 62, preferably twelve in a row in the same spacing as mandrels 44 and mold cores 31 of overmolding station 18. Accordingly, as shown in the overhead view in FIG. 3, adjacent each row of mandrels is preferably a row of openings.

Figure 2A:
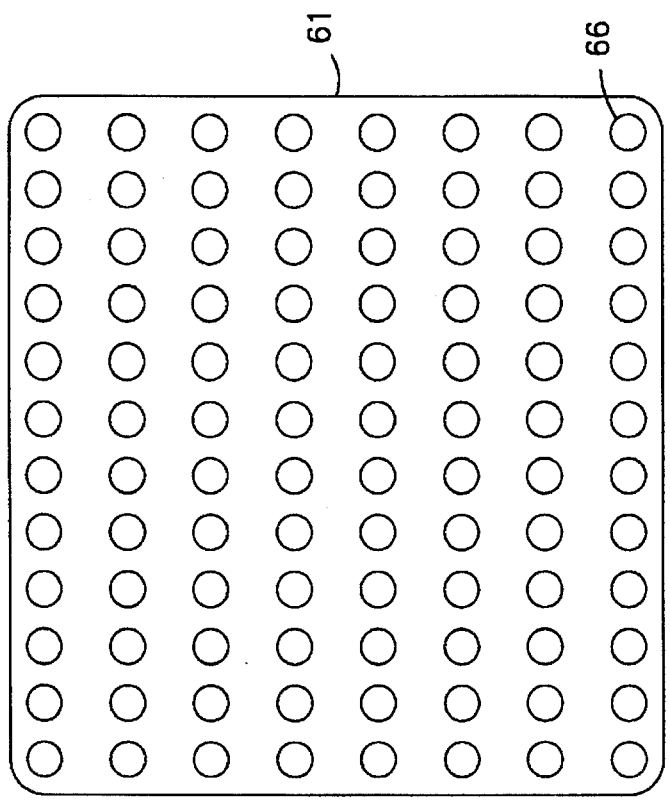
FIG. 2A is a bottom view taken along line 2A—2A of FIG. 2.

Tooling plate 61 is movable between second loading station 35 and overmolding station 18 for relocating the inserts 27. Tooling plate 61 may be movable through approximately 90° upwardly after engaging the inserts, as shown by the dotted line representation of robot 56 in FIG. 2, and prior to moving the inserts to overmolding system 18. Subsequently, tooling plate 61 via robot 56 preferably moves straight from second loading station 35 to the overmolding station 18, as indicated in FIGS. 1 and 2. The actual path of movement is not critical, however, and accordingly, tooling plate 61 may be movable to overmolding station 18 via another path. Robot tooling plate 61 includes a plurality of mechanisms such as vacuum tubes 66, which tubes 66 are operative to remove inserts 27 from mandrels 44 and remove preforms 60 from overmolding station 18, by functioning to engage and release the same. Robot tooling plate 61 is operative to both release finished preforms 60 into openings 62 as well as engage and remove preform inserts 27 from mandrels 44. Accordingly, vacuum tubes 66 are arranged in one grouping of four rows of twelve adapted to be aligned with mandrels 44 and in another grouping of four rows of twelve, as shown in FIG. 2A, adapted to be aligned with openings 62. Tooling plate 61 via tubes 66 preferably applies vacuum through tubes 66 for removing inserts 27 from mandrels 44. By releasing the vacuum in tubes 66 and preferably blowing air through the tubes, finished performs 60 are released into openings 62 in base 46 of a shuttle table 32. When preforms 60 are released into openings 62, the preforms are captured on table 58.

On its return trip to first loading station 34 to acquire more inserts on mandrels 44, shuttle table 32 moves finished preforms 60 over table 58 and down chute 59 for subsequent removal for packaging or further processing. This is preferably accomplished by shuttle table 32 including a flap or scraper 68 extending from the bottom of base 46 and down to the surface of table 58 for displacing the rejected preforms or inserts and the finished preforms. Accordingly, flap 68 scrapes over table 58, pushing finished preforms 60 down chute 59.

In a similar manner, shuttle table 32 moves rejected or aborted preforms 60 into a discard area 70. If, through insert detection system 20, an insert 27 is sensed as not present at the overmolding station 18, as discussed further below, the entire group of inserts may be discarded. Accordingly, prior to the return of shuttle table 32 to second loading station 35, robot tooling plate 61 releases any rejected preforms 60 onto table 58. En route from first loading station 34 to second loading station 35, flap 68 functions to move rejected preforms 60 into discard area 70 down chute 71 in the same manner as discussed above with reference to moving the finished preforms for further processing or packaging.

While shuttle table 32 is moving en route from second loading station 35 to first loading station 34, tooling plate 61 is operative to move arrayed inserts 27 from second loading station 35 to overmolding station 18.

En route from second loading station 35 back to first loading station 34, insert detection system 20 is operative to recheck mandrels 44 of shuttle table 32 using the same transmitters/detectors 53a–53d, to detect the absence of inserts 27 on mandrels 44. If an insert is detected on one of mandrels 44, alarm 52 is again sounded to prevent injection molding at overmolding station 18, which would produce an incomplete and possibly dangerous part. Accordingly, if alarm 52 is signaled, robot tooling plate 61 may be recycled under the command of controller 21 which signals the tooling plate, along with shuttle table 32 for another attempt at picking up the missing insert. Otherwise, the entire batch of inserts may be aborted in a manner similar to as discussed above with regard to rejected preforms.

Figure 5:
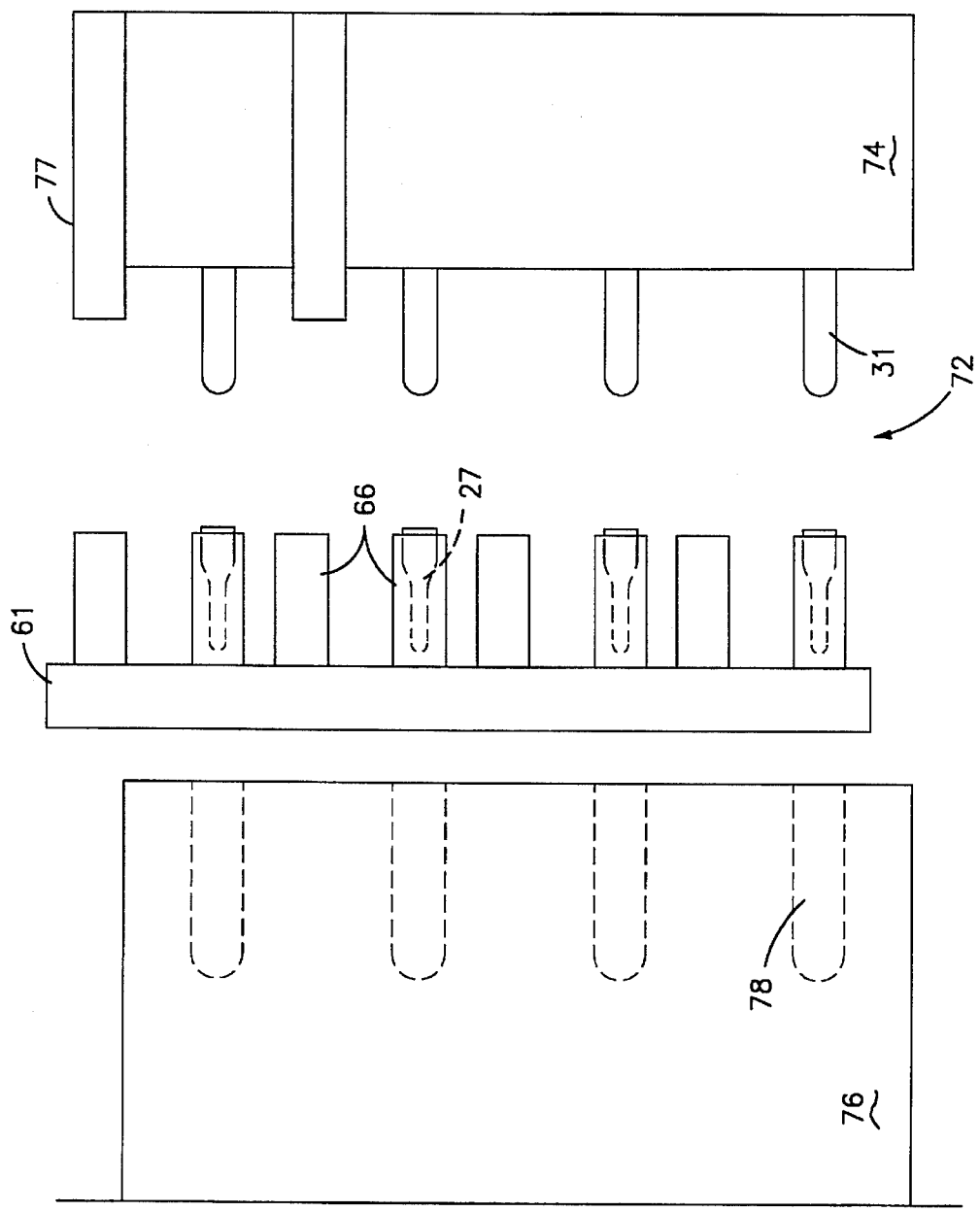
FIG. 5 is an enlarged view of the injection molding system also shown in FIG. 1.

Referring to FIG. 5, robot tooling plate 61 moves inserts 27 into an injection molding machine 72 for overmolding additional layers over insert 27 for forming preform 60, which is desirably multi-layered. Accordingly, robot tooling plate 61 is operative to load inserts 27 onto mold cores 31 of mold portion 74 positioned in injection molding machine 72. Mold cores 31 are arranged, as discussed above, in four parallel rows of twelve equally spaced cores, such that they are in perfect alignment with inserts 27 provided from robot tooling plate 61. Tooling plate 61 is preferably, therefore, movable adjacent the cores of the injection molding machine and functions to place inserts 27 into alignment with respective mold cores 31 of mold portion 74. The vacuum is preferably released in vacuum tubes 66 and air blown therethrough, thereby releasing inserts 27 and forcing inserts 27 onto mold cores 31. With inserts 27 on mold cores 31, air may be evacuated between inserts 27 and cores 31 as insert 27 slides onto the core. Such evacuation can be accomplished via vents (not shown). Optionally, a vacuum could be applied at the core vents to assist in the transfer of the inserts from the vacuum tubes and also to assist in the retention of the inserts on the mold cores as the mold is closed.

Before the mold closes, insert detection system 20 is preferably again operative to detect the presence and absence of inserts 27. Accordingly, insert detection system 20 preferably includes a camera, shown schematically as system 77, directed at the mold cores to detect if an insert 27 is missing therefrom. The system 77 including a camera preferably detects the level of light reflection at the mold cores, which level is indicative of the presence and absence of inserts. An insert detection system such as that used with U.S. Pat. No. 5,286,426, can be used with this invention and is hereby incorporated by reference. However, the type of system used is not necessarily critical and other systems can be used for detecting the presence and absence of inserts on the mold cores. Such systems 77 may include a mechanical system which function to physically test the presence and absence of inserts through the use of mechanical feelers. Also, a vacuum system can be used to test the presence and absence of inserts in the tubes of the robot tooling plate, wherein the level of vacuum pressure is indicative of the absence and presence of the inserts. If an insert 27 is detected as missing, an alarm, preferably alarm 52, is signaled and a reload cycle can optionally be attempted wherein the robot tooling plate 61 is returned to its position adjacent mold cores 31, under the command of controller 21, for a new attempt at releasing any previously unreleased inserts or the entire shot of inserts can be rejected.

Alternatively, each insert can be marked with a detectable mark prior to overmolding. A detection system (not shown) can be used to scan the molded preforms for the marks which indicate an insert was used during overmolding. If a mark is not detected, the preform or entire shot of preforms are rejected.

Referring still to FIG. 5, through injection molding machine 72, layers of resin, preferably PET, are injection molded over inserts 27 to in cavities 78 of mold portion 76, forming preforms 60, having at least two layers. U.S. Pat. No. 4,842,008 to Cahill, issued Jul. 17, 1990, discloses a molding process which may be used with the present invention and is hereby incorporated by reference. After molding, the mold portions 74 and 76 of injection molding machine 72 are opened and robot tooling plate 61 is operative to remove finished preforms 60 from the mold cores and place the same into a carrier plate (not shown) and into a set of cooled preform carrier cavities. Alternatively, the carrier plate may be moved in position relative the mold cores and the finished preforms may be blown or otherwise removed from the mold cores and into the preform carrier cavities. U.S. Pat. No. Re. 33,237 to Delfer, III and assigned to the assignee of the instant invention, discloses the design and operation of the carrier plate desirably used with this invention in detail, and accordingly such disclosure is hereby incorporated by reference into this detailed description. After cooling in the carrier plate, robot tooling plate 61 is then operative to move finished preforms 60 to table 58 and chute 59, as discussed above.

Figure 6B:
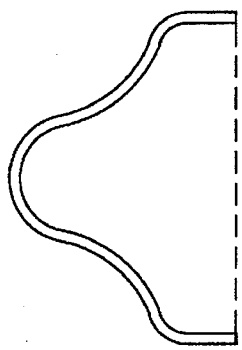
FIGS. 6A and 6B show elevational views of the various preform inserts which can be used with the present invention.
Figure 6A:
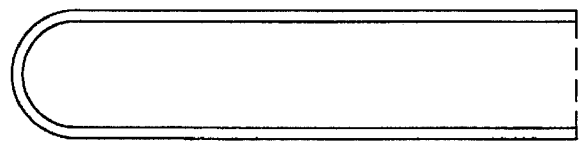

With reference to FIG. 6A and 6B, either one of the preform inserts, i.e. the elongated preform insert shown in FIG. 6A or the shorter wider preform shown in FIG. 6B, for example, can be used with the system described in detail above. Of course, various other insert shapes may be used with this system.

In operation, and with reference to FIGS. 1–5, preform inserts 27 are moved from bowl feeders 26a and 26b onto infeed conveyers 28a and 28b of unscrambling station 12. Inserts 27 are fed into feed screws 30a–30d and are aligned in a four row by twelve insert array for subsequent alignment and placement into an injection molding machine with similarly aligned mold cores. Feed screws 30a–30d feed inserts 27 into first loading station 34 whereat inserts 27 are supported in first loading station 34 via movable flaps 36. Movable shuttle table 32 is positioned under first loading station 34 and upon movement of movable flaps 36 via the actuation of movable arm 38 and cylinder 40, inserts 27 are dropped onto mandrels or pins 44 extending upwardly from shuttle table 32. Shuttle table 32 is preferably moved along tracks 42 to second loading station 35 where en route, insert detection system 20 is preferably operative to scan the rows of inserts 27 via sensors 50 to determine the presence or absence of inserts on mandrels 44. If inserts are detected as absent from mandrels 44, an alarm 52 is preferably sounded and the operation may be stopped and/or recycled for the placement thereon of the missing insert.

Shuttle table 32 moves inserts 27 positioned in the desired array to second loading station 35 positioned within enclosure 54. Robot 56 including robot tooling plate 61 removes inserts 27 from mandrels 44 of shuttle table 32 while simultaneously releasing finished preforms 60 into openings 62 in shuttle table 32. Finished preforms 60 fall through openings 62 onto table 58. After inserts 27 are removed from mandrels 44, the shuttle table 32 returns to first loading station 34 and on the way, flap 68 pushes finished preforms 60 down chute 59 whereat preforms 60 are removed for packaging or further processing.

From the second loading station to the first loading station, insert detection system 20 checks shuttle table 32 for the presence of any remaining inserts 27. If any inserts 27 are detected, alarm 52 is sounded. Operation may be stopped or robot tooling plate 61 may be recycled with shuttle table 32 to pickup any remaining inserts 27.

En route from first loading station 34 to second loading station 35, shuttle table 32 via flap 68 also moves rejected preforms 60 into discard area 70 by scraping across table 58 toward discard area 70. In this scenario, robot tooling plate 61 has previously unloaded rejected or aborted preform 60 onto table 58 for discard.

From second loading station 35, robot tooling plate 61 with inserts 27 removed from mandrels 44 via vacuum tubes 66 moves inserts 27 to overmolding station 18. At overmolding station 18, injection molding machine 72 is preferably operative to overmold an additional layer or layers on insert 27. Accordingly, inserts 27 are dropped onto cores 31 of mold portion 74 of injection molding machine 72 through releasing the vacuum in tubes 66 and preferably blowing pressurized air therethrough. Mold portion 76 with mold cavities 78 is moved to a clamped position with mold portion 74, and inserts 27 are then overmolded with an additional layer or additional layers. Insert detection system 20 is preferably again active to check the presence of inserts 27 on mold cores 31 via system 77 using a camera (shown schematically), prior to molding, which system 77 using a camera is preferably operable to check for the level of light reflection in the mold cores, the level detected indicative of the absence or presence of inserts. After molding, the mold portions 74 and 76 are opened and robot tooling plate 61 via tubes 66 removes finished preforms 60 from the mold cores 31 and finished preforms 60 are subsequently moved to and cooled in the carrier plate (not shown but incorporated by reference). Finally, the cooled preforms are removed from the carrier plate and transported via tooling plate 61 for release onto table 58.

The primary advantage of this invention is that a comprehensive system for unscrambling, handling, moving and overmolding articles while sensing the position of the same throughout the system, is provided. Another advantage of this invention is that a comprehensive system for handling preform inserts for subsequent overmolding to form multi-layered preforms is provided, wherein the system continuously operates to unscramble, arrange, transport, sense, and overmold the inserts. Still another advantage of this invention is that a comprehensive system for overmolding preform inserts to form multi-layered preforms is provided, which system includes an insert detection system for continually tracking the presence or absence of the preform inserts in various stages in the system. And still another advantage of this invention is that a comprehensive system for overmolding preform inserts for forming preforms is provided, which system and process are operative to unscramble and insert inserts into a mold as well as removed finished preforms from the mold and direct the same to a removal station.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A system for manufacturing multi-layered preforms from inserts, comprising:

means for molding said inserts into said multi-layered preforms;

means for arranging said inserts used in forming said preforms into proper position for subsequent relocation to said means for molding;

a first loading station for receiving said inserts from said means for arranging, wherein said inserts are properly positioned for said means for molding when located with said first loading station;

a second loading station;

means for moving said inserts from said first loading station to said second loading station;

means for relocating said inserts from said second loading station to said means for molding; and means for detecting if said inserts are at least one of present and absent during movement through said system.

2. The system according to claim 1, further comprising at least one indicator, wherein if at least one insert is present where said at least one insert should be absent and wherein if at least one insert is absent where said insert should be present, an indicator thereof is actuated.

3. The system according to claim 2, wherein said means for detecting is positioned juxtapose said means for moving and wherein if en route from said first loading station to said second loading station an insert is detected as absent, said indicator is activated.

4. The system according to claim 2, wherein said means for detecting is positioned juxtapose said means for moving and wherein if en route from said second loading station to said first loading station an insert is detected as present, said indicator is activated.

5. The system according to claim 3, wherein said first loading station further comprises:

means for collecting and aligning said inserts as said inserts are provided from said means for arranging; and means for releasing said inserts from said means for collecting, wherein said means for moving receives said plurality inserts from said means for collecting via said means for releasing.

6. The system according to claim 5, wherein said means for moving includes a plurality of elements adapted to engage said inserts.

7. The system according to claim 6, wherein said means for detecting comprises a sensor adapted to sense whether each of said elements has one of said inserts, said indicator comprising an alarm adapted to sound if one of said elements is determined to be absent when one of said inserts should be present and if one of said elements is determined to be present when one of said inserts should be absent.

8. The system according to claim 7, wherein said means for collecting comprises an insert spacing device and supports positioned under said insert spacing device and under said inserts, and wherein said means for releasing comprises said supports being movable from under said inserts for releasing said inserts to said means for moving.

9. The system according to claim 8, wherein said means for moving comprises a shuttle table and said elements comprise pins extending from said shuttle table, said pins spaced to align with said inserts while said inserts are positioned on said insert spacing device, wherein upon moving said supports said inserts are released onto said pins.

10. The system according to claim 9, wherein said insert spacing device comprises at least one screw.

11. The system according to claim 6, further comprising at least one indicator and a second means for detecting said inserts for determining if said inserts are with said means for molding, wherein if one of said inserts is detected as absent said indicator is actuated.

12. The system according to claim 11, wherein said means for molding includes mold cores and said second means for detecting comprises an insert detection means for scanning said mold cores and determining if any of said inserts are missing, said indicator comprising an alarm which is actuated if any of said inserts is missing.

13. The system according to claim 6, further comprising at least one indicator, wherein said means for detecting said inserts is further for determining if any of said inserts remain with said means for relocating, wherein if any of said inserts is found to remain said indicator is actuated.

14. The system according to claim 13, wherein said means for detecting comprises a sensor properly positioned to detect the presence and absence of said inserts.

15. The system according to claim 1, wherein said means for relocating further comprises:

means for engaging and releasing said inserts for placing said inserts in said means for molding; and means for engaging and releasing said multi-layered preforms for removing said preforms from said means for molding and for placing said preforms in position for further processing.

16. The system according to claim 15, further comprising multi-layered preform receiving means for receiving said multi-layered preforms from said means for engaging and releasing said multi-layered preforms.

17. The system according to claim 16, wherein said means for engaging and releasing said preforms includes a plurality of mechanisms which engage and support said preforms and includes a plurality of openings through which said multi-layered preforms pass for reaching said multi-layered preform receiving means.

18. The system according to claim 17, wherein said means for relocating comprises a robot tooling plate movable between said second loading station and said means for molding, said robot tooling plate including said means for engaging and releasing said inserts.

19. The system according to claim 18, wherein said robot tooling plate includes said means for engaging and releasing said multi-layered preforms from said means for molding.

20. The system according to claim 19, wherein each of said means for engaging and releasing said inserts and said means for engaging and releasing said preforms comprises means for applying a vacuum which through said tooling plate and to said inserts and said preforms, and said means for applying a vacuum is operative to release said preforms into said openings for removal via said multilayered preform receiving means.

21. The system according to claim 20, wherein said means for applying a vacuum comprises a plurality of vacuum tubes.

22. The system according to claim 17, including means for displacing said preforms on said multilayer preform receiving means to one of a further processing area and discard area.

23. The system according to claim 22, wherein said means for displacing said preforms comprises a flap adapted to engage said preforms.

24. The system according to claim 12, wherein said insert detection means for scanning comprises a camera for visually scanning the mold cores for said inserts.

25. The system according to claim 15, wherein said means for relocating comprises a robot tooling plate movable between said second loading station and said means for molding, said robot tooling plate including each of said means for engaging and releasing said inserts and said means for engaging and releasing said preforms.

* * * * *